Aug. 3, 1926.

J. H. CLARK 1,594,876

TRAILER

Filed July 16, 1923

Inventor
James H. Clark
By his Attorney
Ralph N. Flint

Aug. 3, 1926.  
J. H. CLARK  
TRAILER  
Filed July 16, 1923  
1,594,876  
2 Sheets-Sheet 2

Inventor  
James H. Clark  
By his Attorney  
Ralph N. Flint

Patented Aug. 3, 1926.

1,594,876

UNITED STATES PATENT OFFICE.

JAMES HARRY CLARK, OF DETROIT, MICHIGAN.

TRAILER.

Application filed July 16, 1923. Serial No. 651,951.

My invention relates to trailers and like vehicles designed to be drawn by tractors, trucks and similar self-propelled hauling agencies; and particularly to four wheel trailers of the type wherein the main load carrying frame is supported by two sub frames located one at each end of the trailer, and each supported from an axle having two wheels at the ends thereof; and which sub frames are both capable of swinging movement about vertically arranged axes or king bolts arranged one at each end of the main load supporting frame; so that the trailer may be drawn in either direction and either end thereof may be regarded as the front end of the vehicle.

In such trailers it has heretofore been customary when hauling the trailer to lock the sub frame having the rear pair of wheels against rotary movement, the front sub frame only being free to swing as the direction of movement of the hauling agency changes. In such schemes, however, the rear wheels do not track with or follow the front wheels in a satisfactory manner; and the trailer, or trailers, when two or more are being drawn, as is often the case, do not run around a corner properly when making a right angle turn.

The principal object of my invention, therefore, is to provide a trailer of the type referred to and wherein a better tracking of the rear wheels relative to the front wheels is secured; such end being attained by leaving both the front and rear sub frames free to swing as the direction of travel of the hauling agency changes, and by connecting said frames with one another through flexible connecting means so arranged that swinging movement of the front frame is communicated to the rear sub frame in a way to cause it to swing in a direction opposite to the movement of the front frame. This causes the rear wheels to run out and away from the center of a curve along which the front wheels are moving; secures a more perfect tracking of the rear wheels after the front wheels; and enables the operator of the hauling agency, especially if two or more trailers are being drawn, to turn corners better than in prior schemes wherein the rear pair of wheels of the trailer or trailers are locked against swinging movement.

Other objects of my invention are to provide various improvements in and relating to subordinate parts and particular features of trailers of the general type and class above referred to, all as will hereinafter appear.

The drawings accompanying and forming a part of this specification illustrate the preferred form of my invention; although the same may be embodied in various other forms so long as such modifications come within the scope of the concluding claim, in which the distinguishing features wherein my invention consists are particularly pointed out.

In the drawings:—

Figure 1:
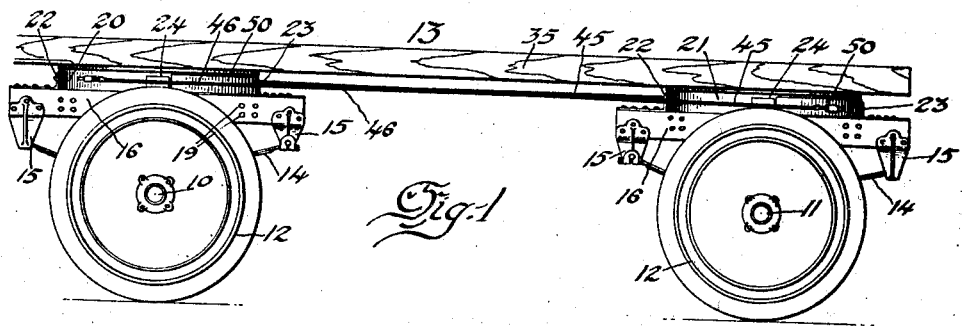
Figure 1 is a view showing my improved trailer in side elevation, the load carrying platform or body being omitted to better show the construction and arrangement of various parts thereof.

Referring now to the drawings wherein the preferred embodiment of my invention is illustrated, and wherein the same reference numerals are employed to designate like parts in the several views; the numerals 10, 11 designate transversely extending front and rear axles having wheels 12 at the ends thereof, and whereby the main frame 13 which supports the platform or load carrying body of my improved trailer is supported; and which wheels, axles, and body may be of any suitable form.

Supported from the axles 10, 11, ordinarily through suitable springs 14 and brackets 15 at the ends thereof, are two end sub frames substantially rectangular in form; each of said frames comprising oppositely disposed longitudinally extending side bars 16, and transversely extending bars 17 extending between said longitudinal bars at the ends thereof. These frame members or bars are preferably channel shaped in cross-section, and the meeting ends thereof are shown as secured together by brackets 18 right angular in form and secured to the bars by rivets or equivalent fastening devices 19.

Supported by and arranged above the sub frames are two annular bearing members or guides 20, 21 shown as right angular in cross-section and the diameters of which are preferably as great as the dimensions of said sub frames will permit; said guides being supported from the sub frames by front and rear brackets 22, 23, and by side brackets 24, 25 located, respectively, at the central portions of the longitudinal and transverse bars which make up said frames; it being appreciated that the said bearing members are supported above the planes of the upper sides of the end frames and that their vertical walls provide cylindrical drum portions, and that their upper ends extend inward to form supports for similar bearing members carried by the main frame 13 of the trailer.

Extending longitudinally of the end sub frames are channel shaped draft plates 26, one for each frame; the ends of said plates being secured to the under side of the upper horizontal portions of the bearing members 20, 21 at diametrically opposite parts thereof as by means of rivets 27.

The main frame 13 is shown as made up of two longitudinally extending side bars 28, 29, and four transversely extending transverse bars 30, 31, 32 and 33; all preferably channel shaped in cross section and all secured together to form a rigid frame structure by means of suitable angle braces 34, and rivets, as will be understood. The longitudinal and transverse bars of the main frame are arranged approximately directly over the similar bars of the sub frames at the ends of the main frame, and wooden bars 35, 36 are commonly bolted to the longitudinal main frame bars to facilitate the attaching of a suitable platform or load carrying body to said main frame, as will be appreciated.

Carried by the main frame formed as aforesaid are two annular bearing members or tracks 37, 38 similar in construction to the bearing members 20, 21; and the lower horizontal portions of which rest, respectively upon the upper horizontal portions of said first described bearing members. The upper cylindrical portions of these main frame bearing members preferably extend upward and above the level of the under side of the main frame as will be understood from Figure 3; and said members are supported from the main frame by right angular front and rear brackets 39, and by similar side brackets 40, arranged ninety degrees apart about the circumference of said upper bearing members.

Figure 2:
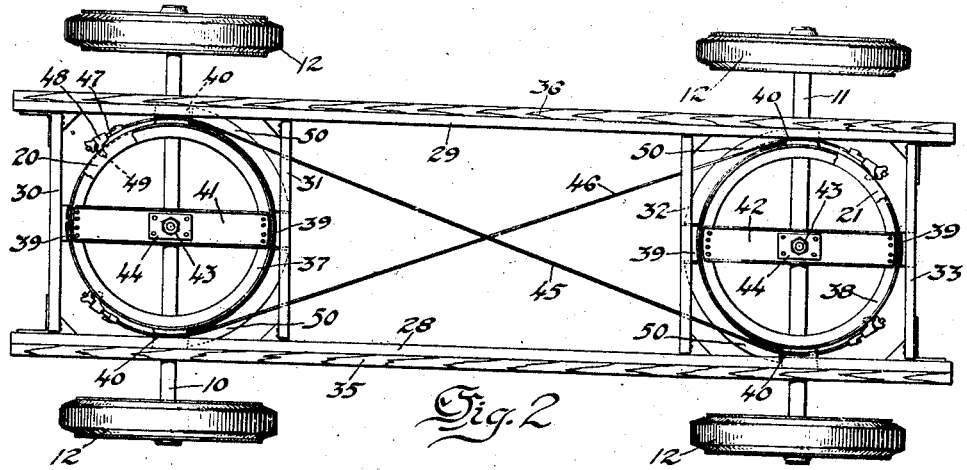
Figure 2 is a similar view showing the trailer in plan.
Figure 4:
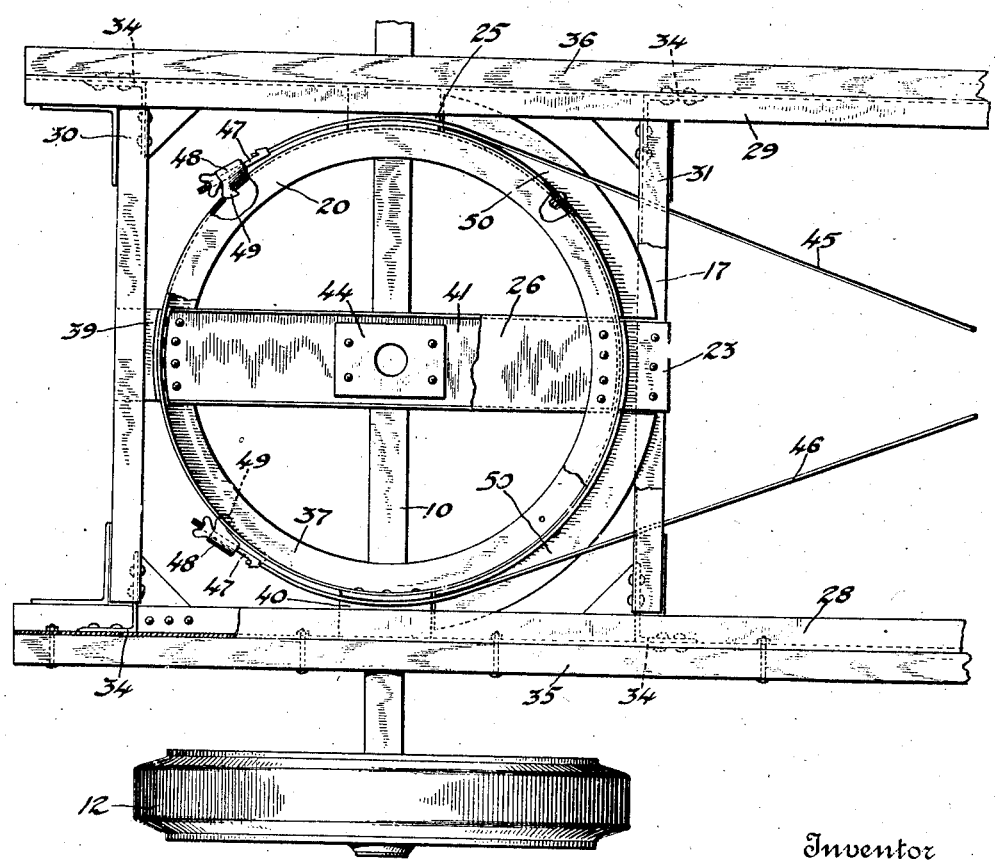
Figure 4 is a view similar to Figure 3 but showing the parts in plan.

Extending from front to rear of the upper bearings 37, 38 are draft plates 41, 42 similar to and which lie directly over the draft plates of the lower bearings which are carried by the sub frames, and the ends of which are secured to the upper surfaces of the horizontal portions of said upper bearing members. The plates 41, 42 and the plates 26 which lie beneath them are provided with central registering holes through which king bolts 43 (see Figure 2) about which the end frames may swing extend, and the area of bearing surface about the said bolts is increased, and a stronger construction secured, by the use of perforated plates 44 secured to the lower and upper sides of the said draft plates respectively.

Figure 3:
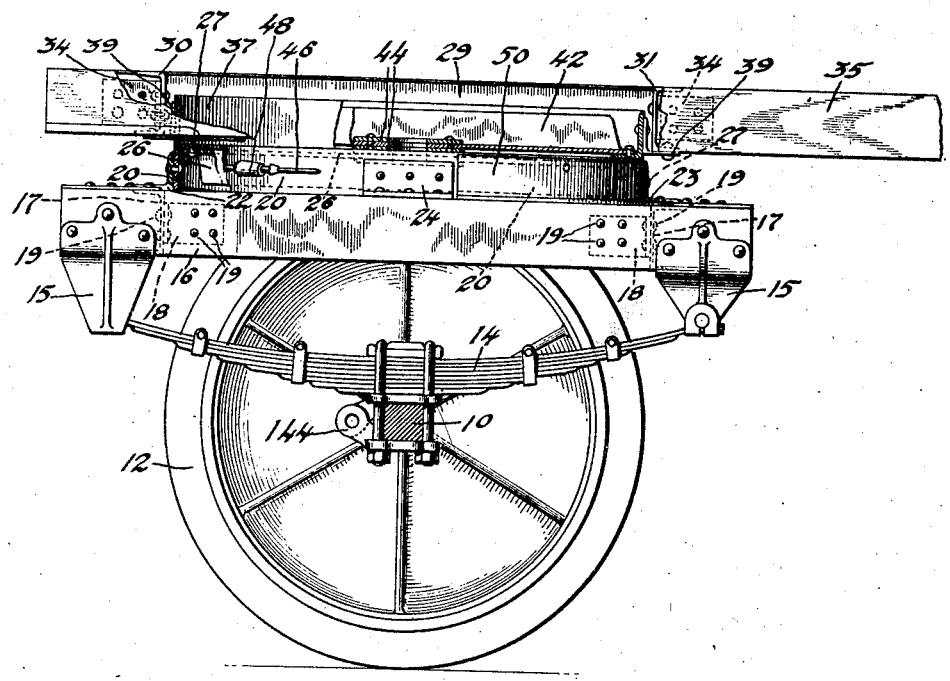
Figure 3 is a view showing one end of the trailer (assumed to be the front end, although both are alike) in side elevation and upon a larger scale.

The sub frames are obviously capable of swinging movement about vertical axles provided by the king bolts 43, 43; and a flexible device or means is provided whereby swinging movement of the front sub frame, being the one which is connected with the hauling agency through a suitable draw bar connected to the front axle through suitable lugs 144, see Figure 3, is communicated to the rear sub frame in such a manner as to cause it to rotate in a direction opposite to the direction of rotary movement of the front frame. This flexible connecting device may take various particular forms; but is preferably made up of two wire cables 45, 46 the front ends of which are connected so as to receive motion from the front sub frame, and which members cross one another at the central portion of the vehicle and the rear ends of which are operatively connected with the rear sub frame so as to swing the same in unison with swinging movement of the front frame. In the form of my invention illustrated the front ends of the cables are provided with threaded rods 47 which extend through anchors 48 having hooks 49 extending into oppositely disposed holes in the vertical cylindrical portions of the bearing member 20, whereby effective connections are secured and connections whereby the cables may be tightened as they stretch; and similar connections are shown at the rear ends of the cables. The particular manner whereby connections are provided between the ends of the cables and the sub frames, however, is of secondary importance, so long as rotary movement of the front frame is communicated to the rear frame as hereinbefore explained.

Obviously the cables 45, 46 wind upon and unwind from the cylindrical portions of the bearing members 20, 21 as the sub frames oscillate about the king bolts 43; and curved filling strips 50 are preferably secured to the cylindrical drums of the bearing members upon opposite sides of the side supporting brackets 24, 25 in order to provide smooth and even surfaces for the cables to work upon.

Having thus described and explained my invention I claim and desire to secure by Letters Patent:—

In a trailer of the class described having a main load supporting frame, front and rear axles adapted to swing about vertical axes adjacent the front and rear ends of the vehicle; front and rear sub frames substantially rectangular in form supported one by each of said axles; two annular bearing members right angular in cross section and arranged to provide vertically disposed cylindrical portions, and horizontal bearing surfaces at the upper ends of said cylindrical portions, said annular bearing members being carried by and arranged above said sub frames and adapted to cooperate with other bearing members located one adjacent each end of the main frame of the trailer; and two flexible members the forward ends of which are secured to the cylindrical portion of the bearing member of the front sub frame and are adapted to wind upon and to unwind therefrom, and which flexible members cross one another and the rear ends of which are secured to the cylindrical portion of the bearing member of the rear sub frame and are adapted to wind upon and to unwind therefrom.

In testimony whereof I have signed this specification this 11th day of July, 1923.

JAMES HARRY CLARK.